United States Patent [19]
Gibbs et al.

[11] Patent Number: 5,456,512
[45] Date of Patent: Oct. 10, 1995

[54] VEHICULAR RACK SLAT SECURANCE

[75] Inventors: Douglas P. Gibbs; Scott R. Allen, both of Yuba City, Calif.

[73] Assignee: Mascotech Accessories, Inc., Sacramento, Calif.

[21] Appl. No.: 394,551

[22] Filed: Feb. 27, 1995

Related U.S. Application Data

[63] Continuation of Ser. No. 119,757, Sep. 10, 1993, abandoned.

[51] Int. Cl.⁶ .................................................. B60R 7/00
[52] U.S. Cl. ........................... 296/37.7; 224/321; 224/325
[58] Field of Search ..................... 296/37.7; 224/309, 224/315, 319, 321, 322, 325

[56] References Cited

U.S. PATENT DOCUMENTS

| | | | |
|---|---|---|---|
| 4,239,138 | 12/1980 | Kowalski | 224/325 X |
| 4,261,496 | 4/1981 | Mareydt et al. | 224/315 |
| 4,269,340 | 5/1981 | Kowalski et al. | 224/325 X |
| 4,295,588 | 10/1981 | Kowalski et al. | 224/325 X |
| 4,364,500 | 12/1982 | Bott | 224/325 |
| 4,372,469 | 2/1983 | Kowalski et al. | 224/325 X |
| 4,428,517 | 1/1984 | Bott | 224/319 X |
| 4,588,117 | 5/1986 | Bott | 224/325 X |
| 4,736,878 | 4/1988 | Rasor | 224/325 X |
| 5,071,050 | 12/1991 | Pudney et al. | 224/322 X |
| 5,273,195 | 12/1993 | Cucheran | 224/321 X |

*Primary Examiner*—Joseph D. Pape
*Attorney, Agent, or Firm*—Flehr, Hohbach, Test, Albritton & Herbert

[57] ABSTRACT

An automotive vehicular rack is described having an adjustable securing mechanism for securing cross slats between side rails. The securing mechanism includes a plunger which is normally urged by a coil spring to a protruding position in which it can register with a selected, corresponding aperture in a side rail. An actuator slide engages the pin defining the plunger to enable a user to slide the pin against the force of the spring as desired, for example, to disengage the cross slat from the side rail.

18 Claims, 2 Drawing Sheets

VEHICULAR RACK SLAT SECURANCE

This is a continuation of application Ser. No. 08/119,757 filed Sep. 10, 1993, now abandoned.

BACKGROUND OF THE INVENTION

The present invention relates to vehicular racks of the type used with automotive vehicles to transport cargo and, more particularly, to the securance of bars of such a rack to one another.

Many vehicle racks include a pair of parallel side rails between which cross bars for securing a load to be carried extend. A vehicle rack which is permanently secured to a vehicle panel, such as to an automotive vehicle roof panel, often also includes cross slats to protect the vehicle panel surface and, in some situations, carry the weight of the load and distribute it along the panel. A good example of this type of vehicular rack is one designed for carrying luggage. The luggage sits on the slats and is secured in position to the cross bars. In this connection, the cross bars typically are spaced from the vehicle panel surface, whereas the cross slats are closely adjacent the panel surface. (It should be mentioned that the term "bars" as used herein without an adjective indicating type is meant to be generic and encompass side rails and cross slats, as well as cross bars.)

It is relatively common to adhere cross slats nonmovably directly to a vehicle panel via an adhesive or the like. While such nonmovable cross slats often are properly positioned to transmit the weight of a load to the vehicle and will protect a vehicle surface from the load, it will be appreciated that in many instances it is desirable that the position of the cross slats be adjustable to assure such protection and correct positioning for load weight carrying. While cross slats arrangements have been provided in the past in which the position of the slats is adjustable, in general they are not easy to use and rely on the strength of the installer himself/herself for tightness. Moreover, such arrangements often have separate pieces which can become lost.

SUMMARY OF THE INVENTION

The present invention provides a vehicular rack having a pair of bars (in the preferred embodiment, a longitudinally extending side rail and a cross slat) which are secured together via a securing mechanism which assures integrity and yet enables the position of the same to be easily adjusted. The securance mechanism is a one piece unit so that no individual hardware pieces which might be lost are required.

From the broad standpoint, the invention includes a vehicular rack bar to be secured to another bar of the rack by a securing mechanism which has a projection configured to register with a corresponding aperture in the first rack bar. Most desirably, the projection is a plunger which is spring loaded to resiliently protrude for registration with a corresponding cavity in the first bar. Such spring loading reduces the possibility that the securing mechanism will fail to retain the desired securance during transportation.

The invention is particularly applicable to the securance of a cross slat to a side rail of a vehicular rack. The cross slat is elongated as is typical, and includes the securing mechanism at each of its opposed ends for securing the cross slat closely adjacent the exterior panel between parallel side rails.

An actuator preferably is included secured to the plunger for moving the same toward the retracted position. Most desirably, such actuator is positioned and configured to be manually graspable so that the cross slat can be easily installed and/or removed.

Other features and advantages of the invention either will become apparent or will be described in connection with the following, more detailed description of a preferred embodiment of the invention.

BRIEF DESCRIPTION OF THE DRAWING

With reference to the accompanying two sheets of drawing.

DETAILED DESCRIPTION OF THE PREFERRED EMBODIMENTS

Figure 1:
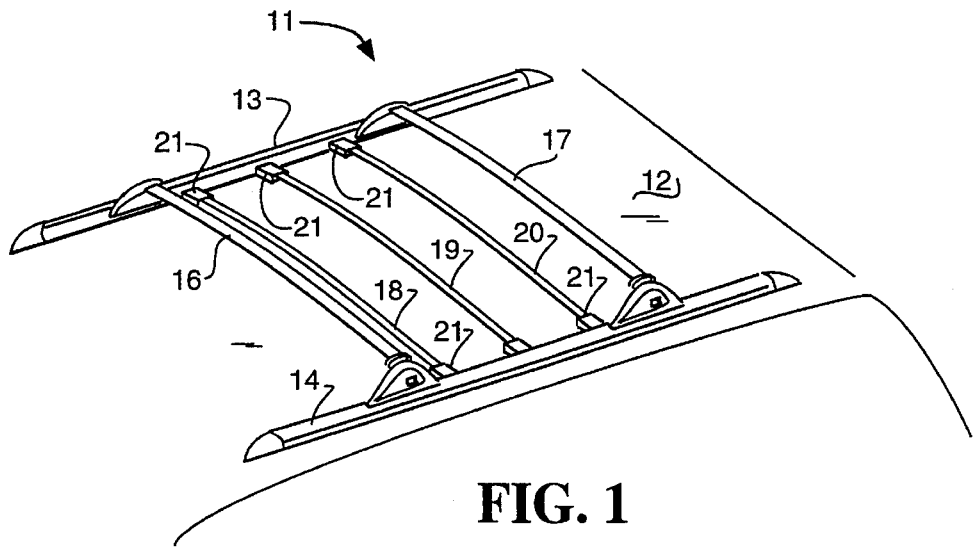
FIG. 1 is an isometric view illustrating an automotive vehicular rack incorporating a preferred embodiment of the invention.

The following relatively detailed description is provided to satisfy the patent statutes. However, it will be appreciated by those skilled in the art that various changes and modifications can be made without departing from the invention.

A vehicular rack, generally referred to by the reference numeral 11, is illustrated on the exterior surface of a roof panel 12 of an automotive vehicle. Such rack includes a pair of spaced apart but parallel and longitudinally extending side rails 13 and 14 which are permanently secured to the panel 12 by, for example, bolts or screws (not shown). Cross bars 16 and 17 extend between such side rails. The position of each of the cross bars 16 and 17 is adjustable as is typical and, in this connection, the side rails often are referred to as "slide" rails. The load to be carried is secured to the cross bars.

Elongated cross car slats 18–20 also extend between the side rails laterally thereof. The purpose of these slats is to act as a base for the load to be carried. If the load to be carried is luggage or the like, such cross slats distribute the weight of the load over a larger area of any vehicle exterior panel having the rack. Moreover, such slats protect the surface of such panel.

In keeping with the invention, securing mechanisms 21 are provided on opposite ends of the individual slats for securance of the ends to their respective side rails. In this connection, it must be remembered that the slats and the securing mechanism as will be described can be used to transmit the load of the cargo to the side rails, i.e., keep the weight of the load from being carried by the portion of the vehicle panel between such side rails.

Each securing mechanism 21 includes a plunger 22 which protrudes from the remainder of such securing mechanism for registration with one of a plurality of cavities, specifically apertures 23–26 (see FIG. 2), in a corresponding side rail. Each plunger 22 is sized and because of its cylindrical shape otherwise is configured to register with each of the corresponding apertures in its associated side rail in a relatively tight fit. A main body 31 of each securing mechanism captures a pin 32 and defines a path for sliding movement of the same between a retracted position and a protruding position. That is, the pin 32 registers in the body with a pair of spaced apart cylindrical holes 33 and 34. An exposed end of the pin 32 defines the plunger 22. Such plunger includes a nose 36 to facilitate sliding movement of the same transversely relative to the side rails. Although not shown, the pin can be tapered immediately behind the plunger to facilitate engagement with a side rail aperture.

Figure 2:
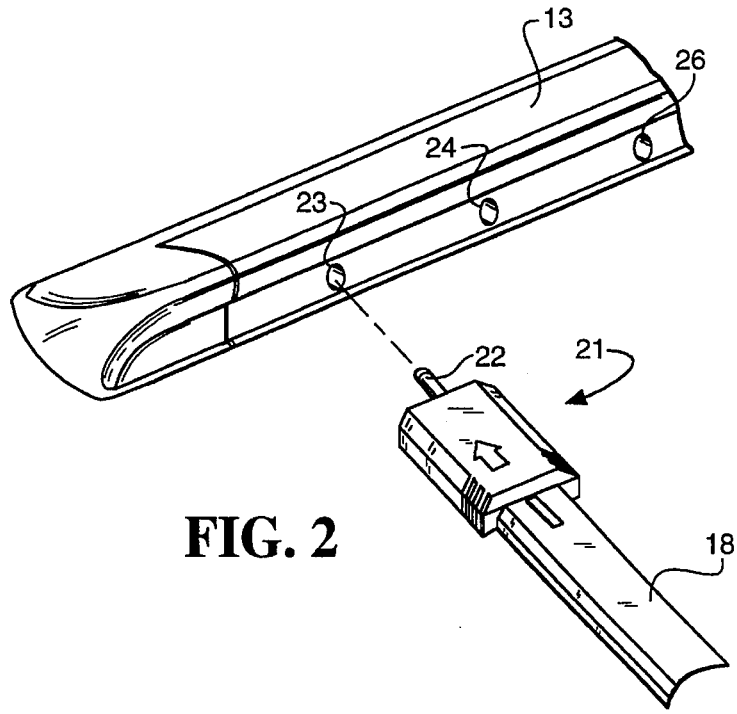
FIG. 2 is a partial, enlarged isometric view illustrating the manner in which a preferred embodiment of the securing mechanism cooperates with a side rail of an automotive vehicular rack to secure a cross slat to such rail.
Figure 3A:
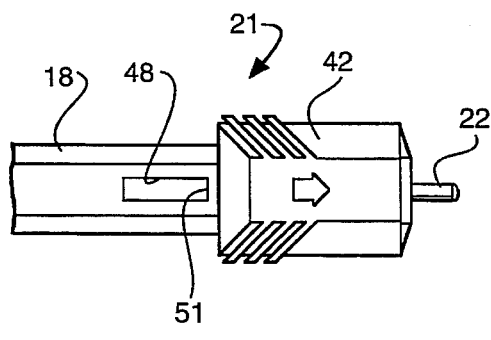
FIGS. 3A and 3B are top elevation views of a preferred embodiment of the securing mechanism showing the plunger in its extended and retracted positions, respectively.
Figure 4A:
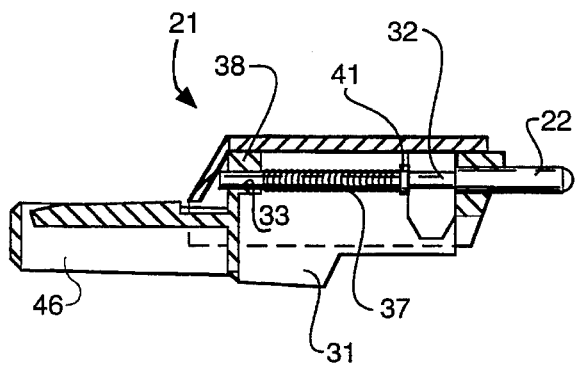
FIGS. 4A and 4B are side sectional views of the securing mechanism taken on a plane indicated in FIGS. 3A and 3B by the lines labeled 4A—4A and 4B—4B, respectively.

The pin 32 and, hence, the plunger 22 is normally urged to the protruding position shown in FIGS. 2, 3A and 4A. In the preferred embodiment being described, this protruding position is one in which the pin protrudes from the remainder of the securing mechanism 11. (It will be appreciated, though, that the protruding position need not necessarily be one in which there is protrusion beyond the remainder of the securing mechanism.) That is, a coil spring 37 coaxially surrounding the pin is compressed between the depending nub 38 on the body 31 defining the aperture 31 and a stop flange 41 on the pin.

Figure 3B:
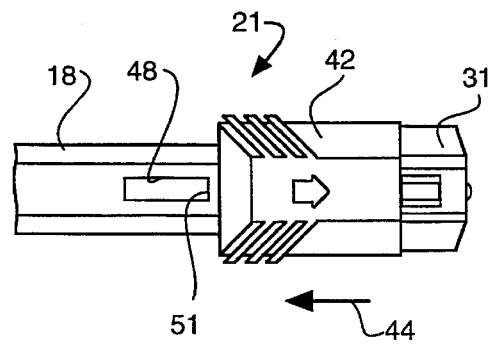
Figure 4B:
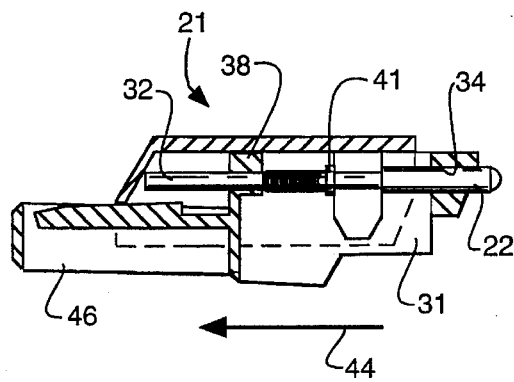
Figure 5:
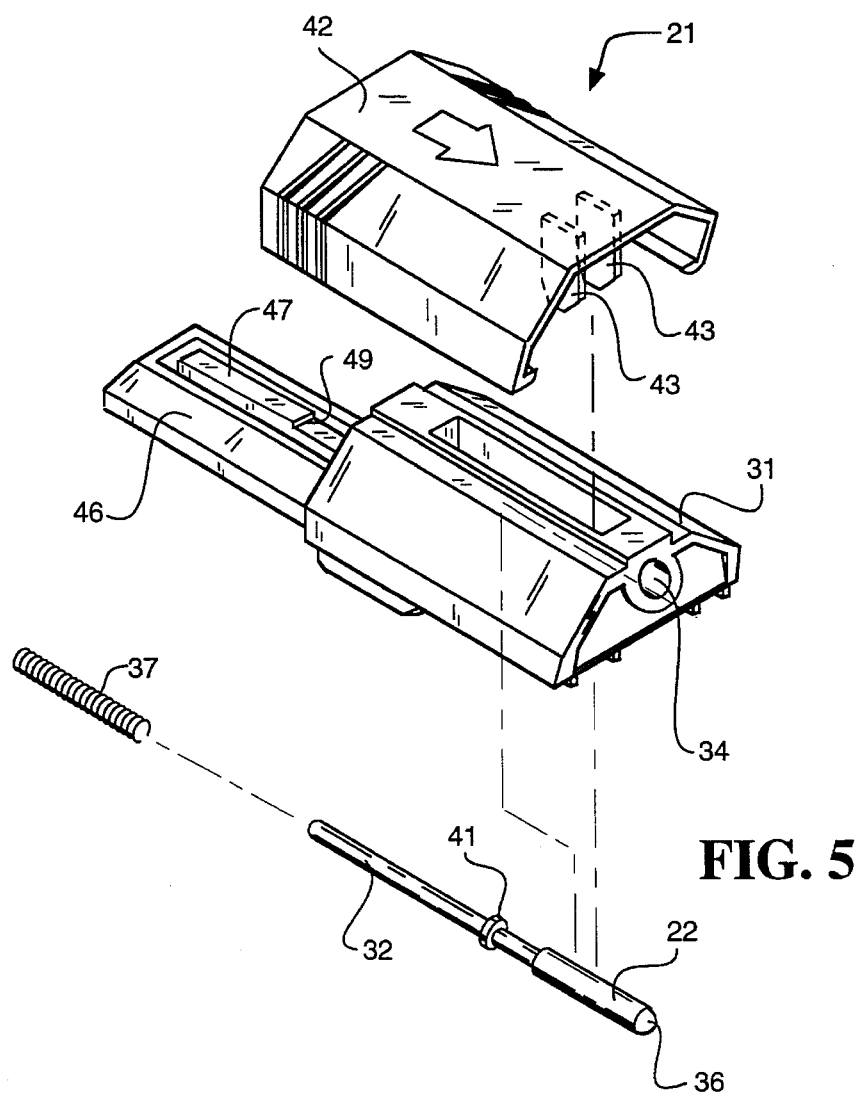
FIG. 5 is a exploded isometric view of the securing mechanism.

The pin and again, hence, the plunger 22 is movable to a retracted position to permit its engagement/disengagement with a corresponding aperture of a side rail. Such retracted position and the relationship of the parts is illustrated in FIGS. 3B and 4B. One of the parts of the securing mechanism is an actuator slide 42 which facilitates movement of the plunger between the protruding position and the retracted position. That is, an exterior actuator slide 42 has a pair of parallel but spaced apart depending ears 43 which engage the pin between the flange 41 and an enlarged end section of such pin defining the plunger 22. It will be seen with reference to such figures, that movement of the actuator in the direction of the arrows 44 results in movement of the pin in the direction of such arrows against the compressive force of the spring 37.

The main body 31 of the securing mechanism also includes means to secure such securing mechanism to the cross slat. Such means takes the form in this preferred embodiment of a tongue 46 which is configured to fit tightly within the interior of an end of the cross slat. It includes an elongated finger 47 that is secured only to one end of the remainder of the body so as to be resiliently secured thereto. In this connection the actuator and the body 31 preferably are made of the same hard plastic material, e.g., a hard polypropylene. When the tongue 46 is inserted in the end of a cross slat, the finger 47 snaps into a slot 48 provided in such cross slat end. A shoulder 49 on the finger engages a front edge 51 of the slot in the cross slat to lock the securing mechanism to the cross slat.

It will be appreciated that although in this preferred embodiment the securing mechanism includes means to secure the same to the cross slat, in some arrangements the securing mechanism can be provided as an integral part of the cross slat.

The ease with which the securing mechanism provides securance of a cross slat to the remainder of a vehicular rack should readily be apparent. The user need only register the plunger at one end of the cross slat with a desired aperture in a side rail, and then engage a desired aperture in the other rail by sliding the plunger of the securing mechanism of the other cross slat along such side rail adjacent the desired aperture. It will be recognized that because of the construction, the strength of the user is not a factor in determining the tightness of connection that is provided. There also are not separate parts which need be manipulated by the user in order to provide the desired cross slat securance.

When it is desired to disengage the cross slat, it is only necessary for the user to retract the actuator to remove the plunger from its associated aperture. In this connection, the exterior of the actuator is configured as illustrated to facilitate manual grasping. In some instances such grasping may be desired to make sure the plunger is in a fully "home" position in an associated aperture for the securance.

As mentioned at the beginning of the detailed description, applicants are not limited to the specific embodiment described above. Various changes and modifications can be made. The claims, their equivalents and their equivalent language define the scope of protection.

What is claimed is:

1. In a vehicular rack having a first rack bar to be secured to an exterior panel of a vehicle, the combination comprising:

(a) a slat to be secured to said first rack bar closely adjacent said panel to act as a base for a load carried by said vehicular rack; and (b) a securing mechanism to secure said slat to said first rack bar, said securing mechanism including a projection configured to register with a corresponding cavity in said first bar of said vehicular rack, which projection is movable between a retracted position relative to said slat and a protruding position for said registration.

2. The vehicular rack of claim 1 wherein said securing mechanism is adapted to secure said slat to said first rack bar with said slat extending laterally of said first rack bar.

3. The vehicular rack of claim 1 wherein said securing mechanism also includes means for securing said mechanism to said slat.

4. The vehicular rack of claim 1 wherein said vehicular rack includes a pair of said first rack bars generally parallel to one another, and said slat is to be secured to both of said pair so as to extend therebetween.

5. The vehicular rack of claim 4 wherein said slat has a securing mechanism at each of its opposed ends to secure said slat to corresponding ones of said first bars.

6. In a vehicular rack having a first rack bar to be secured to a vehicle, the combination comprising:

(a) a second rack bar to be secured to said first rack bar; and (b) a securing mechanism to secure said second rack bar to said first rack bar, said securing mechanism including a projection configured to register with a corresponding cavity in said first bar of said vehicular rack, which projection is movable between a retracted position and a protruding position for said registration, said securing mechanism further including means for resiliently urging said projection toward said protruding position.

7. The vehicular rack of claim 6 further including an actuator secured to said projection for moving said projection against said urging toward said retracted position.

8. In a vehicular rack having a first rack bar to be secured to a vehicle, the combination comprising:

(a) a second rack bar to be secured to said first rack bar; and (b) a securing mechanism to secure said second rack bar to said first bar, said securing mechanism including a plunger which is spring loaded to a protruding position for registration with a corresponding cavity in said first bar of said vehicular rack.

9. The vehicular rack of claim 8 wherein said projection is movable between a retracted position and said protruding position for said registration.

10. The vehicular rack of claim 8 wherein said securing mechanism is adapted to secure said second rack bar to said first rack bar with said second rack bar extending laterally of said first rack bar.

11. The vehicular rack of claim 8 wherein said securing mechanism also includes means for securing said mechanism to said second rack bar.

12. The vehicular rack of claim 8 wherein said securing mechanism further includes means for resiliently urging said projection toward said protruding position and an actuator secured to said projection for moving the same against said urging toward said retracted position.

13. The vehicular rack of claim 8 wherein said vehicular rack includes a pair of said first rack bars generally parallel to one another, and said second rack bar is to be secured to both of said pair so as to extend therebetween.

14. The vehicular rack of claim 13 wherein said second rack bar is an elongated slat having a securing mechanism at each of its opposite ends to secure said slat to a corresponding one of said first bars.

15. The vehicular rack of claim 14 wherein both of said first rack bars are to be secured to the same exterior panel of said vehicle, and said slat is to be positioned between said pair of first bars closely adjacent said exterior panel.

16. In a vehicular rack having a first rack bar to be secured to a vehicle, the combination comprising:
  (a) a second rack bar to be secured to said first rack bar; and
  (b) a securing mechanism to secure said second rack bar to said first rack bar, said securing mechanism including a body having:
    (1) means for attaching said securing mechanism to said second rack; and
    (2) means for defining a path for sliding movement of a pin relative to the remainder of said body between a retracted position and a protruding position;
  said securing means also including:
    (1) a pin captured by said body on said path;
    (2) a coil spring normally urging said pin to said protruding position, which spring is in engagement with both said pin and said body to be compressed and resist sliding movement of said pin from said protruding position to said retracted position; and
    (3) an actuator secured to said pin for moving said pin toward said retracted position.

17. The vehicular rack of claim 16 wherein said actuator is positioned and configured to be manually graspable for said moving of said pin toward said retracted position.

18. The vehicular rack of claim 16 wherein said vehicular rack includes a pair of said first rack bars to be secured to an exterior panel of said vehicle generally parallel to one another; and wherein said second rack bar is an elongated slat having a securing mechanism at each of its opposed ends to secure each to a corresponding one of said first bars between said pair of first bars, closely adjacent said exterior panel of said vehicle.

* * * * *